United States Patent
Hu et al.

(10) Patent No.: US 12,272,962 B2
(45) Date of Patent: Apr. 8, 2025

(54) METHOD AND APPARATUS FOR CONTROLLING WIRELESS CHARGING OF WIRELESS CHARGING SYSTEM OF TERMINAL DEVICE, AND TERMINAL DEVICE

(71) Applicant: BEIJING XIAOMI MOBILE SOFTWARE CO., LTD., Beijing (CN)

(72) Inventors: Yongxiu Hu, Beijing (CN); Guangshuai Lu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 724 days.

(21) Appl. No.: 17/459,360

(22) Filed: Aug. 27, 2021

(65) Prior Publication Data

US 2022/0302755 A1     Sep. 22, 2022

(30) Foreign Application Priority Data

Mar. 19, 2021 (CN) .......................... 202110297652.6

(51) Int. Cl.
*H02J 50/10* (2016.01)
*H02J 7/00* (2006.01)

(52) U.S. Cl.
CPC .......... *H02J 50/10* (2016.02); *H02J 7/00712* (2020.01); *H02J 7/007192* (2020.01); *H02J 2207/20* (2020.01)

(58) Field of Classification Search
CPC ...................................... H02J 50/10
USPC ............................................ 320/108
See application file for complete search history.

(56) References Cited

U.S. PATENT DOCUMENTS

| | | | | |
|---|---|---|---|---|
| 2012/0115549 A1* | 5/2012 | Kim | ......................... | H02J 50/80 455/566 |
| 2019/0319478 A1 | 10/2019 | Zhang et al. | | |
| 2019/0326768 A1* | 10/2019 | Park | ......................... | H02J 50/80 |
| 2020/0203980 A1* | 6/2020 | Lee | ......................... | H02J 50/80 |
| 2020/0235601 A1* | 7/2020 | Chen | ......................... | H02J 50/10 |

FOREIGN PATENT DOCUMENTS

| | | |
|---|---|---|
| CN | 108242836 A | 7/2018 |
| CN | 112332501 A | 2/2021 |
| JP | 2018108014 A | 7/2018 |

OTHER PUBLICATIONS

European Patent Application No. 21197331.8 Search and Opinion dated Mar. 22, 2022, 8 pages.
Chinese Patent Application No. 202110297652.6, Office Action dated May 23, 2024, 7 pages.
Chinese Patent Application No. 202110297652.6, English translation of Office Action dated May 23, 2024, 8 pages.

* cited by examiner

*Primary Examiner* — Yalkew Fantu
(74) *Attorney, Agent, or Firm* — Cozen O'Connor

(57) ABSTRACT

A method and an apparatus for controlling wireless charging, and a terminal device. The method includes: obtaining a charging power and a temperature of the terminal device; determining an operating mode of the wireless charging system in the terminal device based on the charging power and the temperature according to a preset rule, in which the preset rule includes at least two control rules and operating modes corresponding to the at least two control rules respectively; and controlling the wireless charging system to enter the operating mode corresponding to one of the at least two control rules.

18 Claims, 5 Drawing Sheets

METHOD AND APPARATUS FOR CONTROLLING WIRELESS CHARGING OF WIRELESS CHARGING SYSTEM OF TERMINAL DEVICE, AND TERMINAL DEVICE

CROSS-REFERENCE TO RELATED APPLICATIONS

This application claims priority to Chinese Patent Application No. 202110297652.6 filed on Mar. 19, 2021, the content of which is hereby incorporated by reference in its entirety into this disclosure.

TECHNICAL FIELD

The disclosure generally relates to the field of wireless charging technologies, and in particular to a method for controlling wireless charging, an apparatus for controlling wireless charging, a terminal device and a storage medium.

BACKGROUND

With rapid development of information technology, functions of electronic devices are becoming more powerful, and technologies for charging the electronic devices are being continuously developed and improved. Currently, wireless charging technologies have been applied to a large number of electronic devices. Wireless charging takes advantage of wireless power transmission technologies that use magnetic fields and other media to transmit electric energy. They have characteristics of high portability and are not limited by plugging the device into a charging cord. In order to improve the wireless charging efficiency of wireless charging devices, research on wireless charging power is particularly important.

SUMMARY

Embodiments of the disclosure in a first aspect provide a method for controlling wireless charging. The method includes: obtaining by a terminal device, a charging power and a temperature of the terminal device, in which the terminal device includes a wireless charging system; determining by the terminal device, an operating mode of the wireless charging system based on the charging power and the temperature according to a preset rule, in which the preset rule includes at least two control rules and operating modes corresponding to the at least two control rules respectively; and controlling by the terminal device, the wireless charging system to enter the operating mode corresponding to one of the at least two control rules.

Embodiments of the disclosure in a second aspect provide an apparatus for controlling wireless charging. The apparatus includes a processor and a memory configured to store instructions executable by the processor.

The processor is configured to read and execute instructions stored in the memory, so as to: obtain a charging power and a temperature of a terminal device; determine an operating mode of a wireless charging system in the terminal device based on the charging power and the temperature according to a preset rule, in which the preset rule includes at least two control rules and operating modes corresponding to the at least two control rules respectively; and control the wireless charging system to enter the operating mode corresponding to one of the at least two control rules.

Embodiments of the disclosure in a third aspect provide a terminal device. The terminal device includes: a receiving coil, configured to receive a current emitted by a wireless charging device; a receiver, configured to convert the current coupled by the receiving coil to a direct current; a first charge pump, wherein a first end of the first charge pump is coupled to the receiver; a second charge pump, wherein a first end of the second charge pump is coupled to the first charge pump; a power management IC (PMIC), wherein a first end of the PMIC is coupled to a second end of the first charge pump; a battery, wherein a second end of the second charge pump and a second end of the PMIC are coupled to the battery; a temperature sensor, configured to obtain a temperature of the terminal device; and a processor, coupled to the first charge pump, the second charge pump, the PMIC, the temperature sensor and the receiver respectively, and configured to obtain a charging power based on the direct current, to obtain the temperature, and to control the first charge pump, the second charge pump and the PMIC to enter respective operating modes based on the charging power and the temperature according to a preset rule, in which the preset rule comprises at least two control rules and operating modes corresponding to the at least two control rules respectively.

BRIEF DESCRIPTION OF THE DRAWINGS

By reading detailed description of the non-restrictive embodiments with reference to the following drawings, additional features, purposes and advantages of the disclosure become apparent.

DETAILED DESCRIPTION

Figure 1:
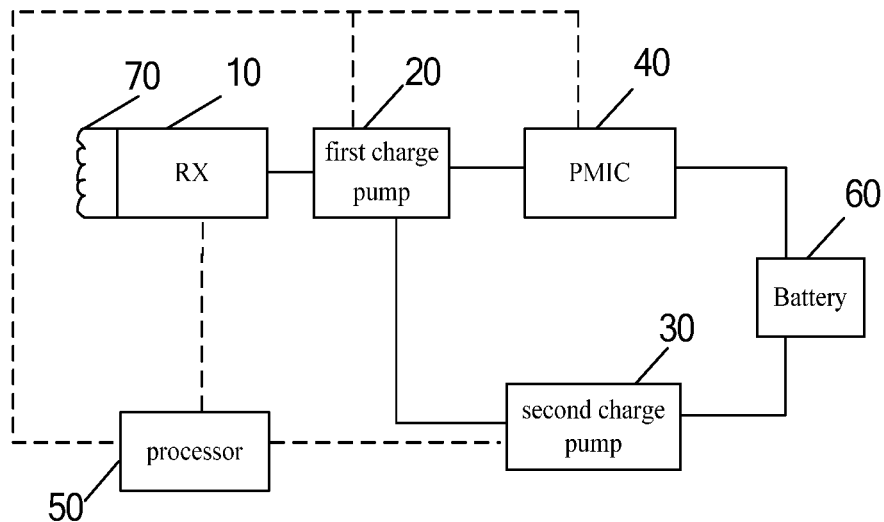
FIG. 1 is a block diagram of a wireless charging system according to an embodiment of the disclosure.

The disclosure will be described in detail below with reference to the accompanying drawings and the embodiments. It should be understood that, the specific embodiments described herein are only used to explain the disclosure rather than to limit the disclosure. In addition, it should also be noted that, for convenience of description, only part but not all structures related to the disclosure are illustrated in the accompanying drawings.

It should be noted that embodiments of the disclosure and features in the embodiments may be combined without conflict. Hereinafter, the disclosure is described in detail with reference to the drawings in combination with the embodiments.

It may be understood that as the functions of electronic devices become more powerful, the requirements for endurance of the electronic devices are increasing. The wireless charging technology is applied to various electronic devices, so that wireless charging can be achieved through principles such as electromagnetic induction, radio waves, electromagnetic resonance and electric field coupling. In electromagnetic induction, the current passes through the coil, and the coil generates a magnetic field, which induces electromotive force to nearby coils to generate current. Generally, in the process of wireless charging, the terminal device needs to be placed in a charging base. A power transmitting coil is installed in the charging base, and a receiving coil is installed in the electronic device. The power transmitting coil transmits power through electromagnetic induction, and the receiver in the electronic device receives power through the receiving coil and provides energy to a subsequent stage through a rectification and power conversion circuit (such as a charging circuit). Meanwhile, the receiver in the electronic device may adjust the charging voltage by sending commands through the communication interface, and may completely terminate power transmission after receiving an indication of the end of charging. Since the wireless charging efficiency is related to power, generally, the greater the power, the larger the magnetic field range; the closer the distance, the better the efficiency; and the shorter the distance between the receiving coil and the transmitting coil, the higher the efficiency of power conversion. In order to improve the charging efficiency of the wireless charging device, the wireless charging power may be increased.

There are two ways to increase the wireless charging power in the related art. One way is to increase the current at the output terminal of the wireless charging system. However, increasing the current at the output terminal will increase the loss of charging coils, switches and other devices, and cause a large heating value of the electronic device, thereby impacting the wireless charging effect. The other way is to increase a voltage at the output terminal while keeping the current at the output terminal unchanged. However, continuous high-voltage and high-power charging affects the safety of wireless charging, resulting in poor user experience.

Based on the above defects, the disclosure provides the method for controlling wireless charging. Compared to the related art, in this solution, at least two control rules are provided, and only the charging power and the temperature need to be obtained, which can automatically control the wireless charging system to enter the operating mode corresponding to each control rule, not only realizing fast and efficient wireless charging, but also ensuring the safety of wireless charging, avoiding the loss of charging coils, switches and other devices, and further improving the user experience.

The terminal device in embodiments of the disclosure may include mobile terminals such as a mobile phone, a tablet computer, a notebook computer, a palmtop computer, a PDA (Personal Digital Assistant), a PMP (Portable Media Player), a navigation device, a wearable device, a smart bracelet, and a pedometer, as well as fixed terminals such as digital TVs and desktop computers.

The method for controlling wireless charging according to embodiments of the disclosure may be applied to the terminal device, and the terminal device includes the wireless charging system. FIG. 1 is a block diagram of a wireless charging system according to an embodiment of the disclosure. As illustrated in FIG. 1, the wireless charging system includes a receiver (RX) 10, a first charge pump 20, a second charge pump 30, a power management integrated circuit (PMIC) 40, a processor 50 and a battery 60. A first end of the receiver 10 is coupled to a receiving coil 70, and a second end of the receiver 10 is coupled to a first end of the first charge pump 20. A second end of the first charge pump is respectively coupled to a first end of the PMIC 40 and a first end of the second charge pump 30. A second end of the PMIC 40 and a second end of the second charge pump 30 are respectively connected to the battery 60.

The above receiving coil is configured to receive the current emitted by the wireless charging transmitting coil, and the receiver 10 is configured to convert an alternating current coupled by the receiving coil into direct current.

The first charge pump and the second charge pump are DC-DC converters that use capacitors as energy storage elements for voltage conversion. DC/DC voltage conversion is performed by using a switching network to supply or power off two or more capacitors. The first charge pump and the second charge pump may be used as inverters, splitters or boosters. When the first charge pump and the second charge pump are used as inverters, the input voltage is converted into a negative output, and when used as splitters, the output voltage is a part of the input voltage, such as ½ or ⅔, and when used as boosters, 1.5× or 2× gain are brought to I/O. In this embodiment, the first charge pump and the second charge pump may be used as splitters. The first charge pump may operate in mode A. The mode A has three operating modes, namely A1, A2, and A3. The modes A1, A2, and A3 respectively correspond to the ratios of the input voltage to the output voltage, i.e., 3:1, 2:1, 1:1. The second charge pump operates in mode B. The mode B has two operating modes, namely B1 and B2, the two modes B1 and B2 correspond to the ratios of input voltage to output voltage, i.e., 2:1, 1:1.

PMIC 40 is an integrated circuit that includes multiple power rails and power management functions in a single chip, which is used for charging control, and may control the value of the current. The PMIC may be a wireless charging control chip that operates in mode C.

The battery may be a lithium battery, and power may be charged into the lithium battery through a voltage transformation operation of the first charge pump and the second charge pump.

For ease of understanding and description, the method and apparatus for controlling wireless charging, the device, and the storage medium according to embodiments of the disclosure are described in detail below with reference to FIGS. 2 to 6.

Figure 2:
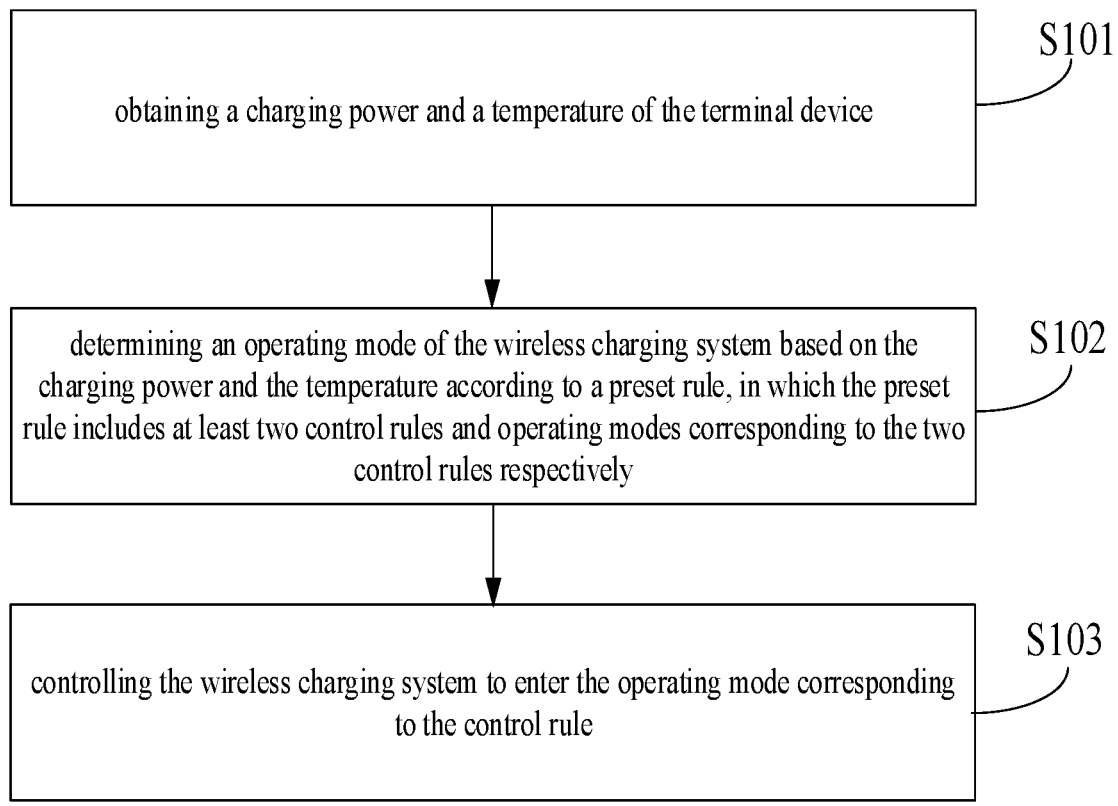
FIG. 2 is a flowchart of a method for controlling wireless charging according to an embodiment of the disclosure.

FIG. 2 is a flowchart of a method for controlling wireless charging according to an embodiment of the disclosure. The method may be executed by a wireless charging control device. As illustrated in FIG. 2, the method includes the following steps.

At step S101, a charging power and a temperature of the terminal are obtained.

In detail, a wireless charging protocol corresponding to the terminal device and the wireless charging base may be preset. The wireless charging protocol may be a private protocol obtained after modifying or perfecting a public protocol. Private wireless charging protocols of different manufacturers are incompatible. The private protocols may include, for example, MTK protocol, Qualcomm protocol, PD protocol or VOOC flash charging protocol, etc. It should be noted that the public protocol may be a Qi protocol based on Qi standard. The Qi standard is a wireless charging standard launched by the wireless power consortium, which is the world's first standard organization to promote wireless charging technologies, has two major characteristics of convenience and versatility, and may be implemented by electromagnetic induction technologies.

In order to prevent the wireless charging base from wirelessly charging unauthorized terminal devices, the wireless charging device (such as the wireless charging base) often needs to authenticate the terminal device. After the authentication is successful, the wireless charging device charges the device to be charged wirelessly. That is, there is a need to determine whether the terminal device complies with the wireless charging protocol.

In detail, when the terminal device needs to be wirelessly charged, the user may place the terminal device on the wireless charging base. At this time, the connection between the terminal device and the wireless charging base is established, and the terminal device may send a communication signal to the wireless charging base. The communication signal is configured to determine whether the terminal device complies with the wireless charging protocol. When the terminal device complies with the wireless charging protocol, it means that the terminal device supports the wireless fast charging function. In order to avoid damage to the terminal device during high-voltage and high-power wireless charging, it is necessary to obtain the charging power and the temperature of the terminal, and determine the operating mode of the wireless charging system based on the charging power and the temperature, so as to achieve safe and efficient wireless charging. The charging power is the charging power of the transmitter TX in the wireless charging base.

When the terminal device does not comply with the wireless charging protocol, the operating mode of the first charge pump is determined as a third mode (mode A3), that is, the ratio of the input voltage to the output voltage is 1:1, and the operating mode of the PMIC is determined as the charging mode, and the lithium battery in the terminal device is normally charged under the control of the PMIC.

At step S102, an operating mode of the wireless charging system is determined based on the charging power and the temperature according to a preset rule, in which the preset rule includes at least two control rules and operating modes corresponding to the at least two control rules respectively.

At this step, the preset rule may be set in advance, and the preset rule may include a first control rule and a second control rule. For each of different control rules, the determined operating modes corresponding to respective devices in the wireless charging system are different. The devices in the wireless charging system may include the first charge pump, the second charge pump, and PMIC.

Figure 3:
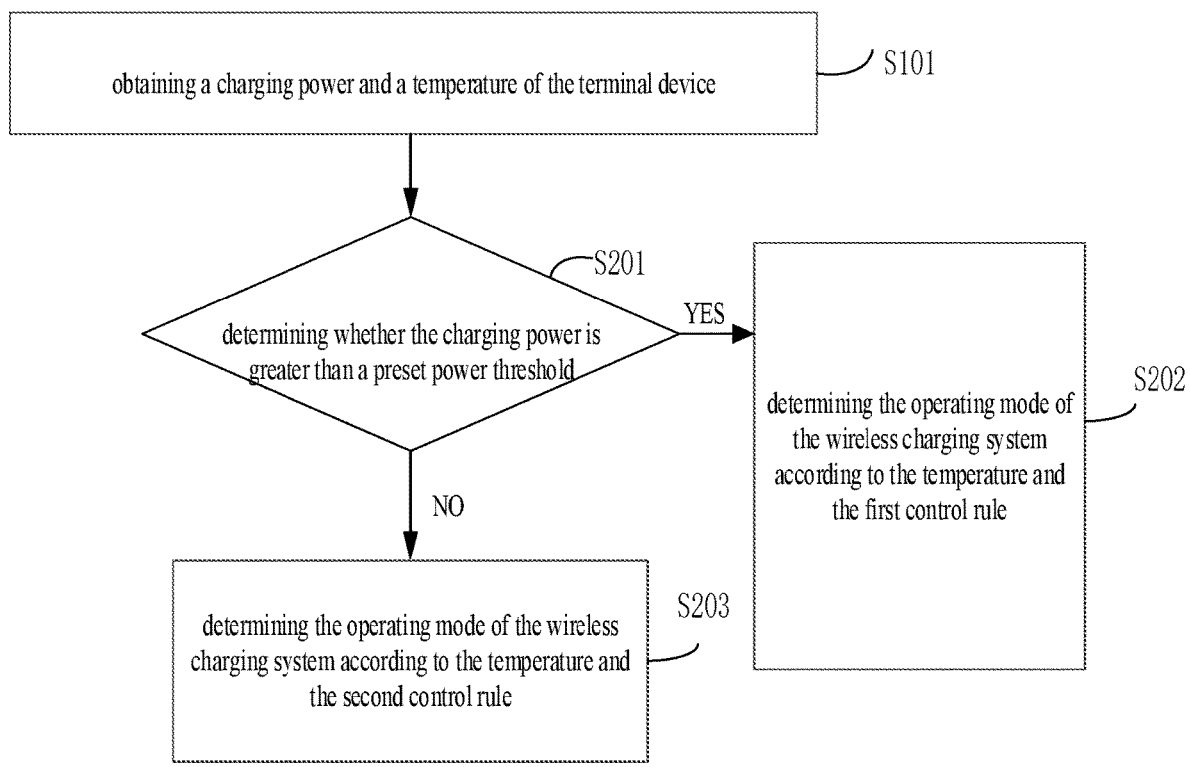
FIG. 3 is a flowchart of a method for controlling wireless charging according to an embodiment of the disclosure.

Optionally, as a possible implementation, FIG. 3 is a flowchart of a method for controlling wireless charging according to an embodiment of the disclosure. As illustrated in FIG. 3, the method includes the following steps.

At step S101, a charging power and a temperature of the terminal are obtained.

At step S201, it is determined whether the charging power is greater than a preset power threshold.

At step S202, the operating mode of the wireless charging system is determined according to the temperature and the first control rule in response to the charging power being greater than the preset power threshold.

At step S203, the operating mode of the wireless charging system is determined according to the temperature and the second control rule in response to the charging power being equal to or less than the preset power threshold.

Figure 4:
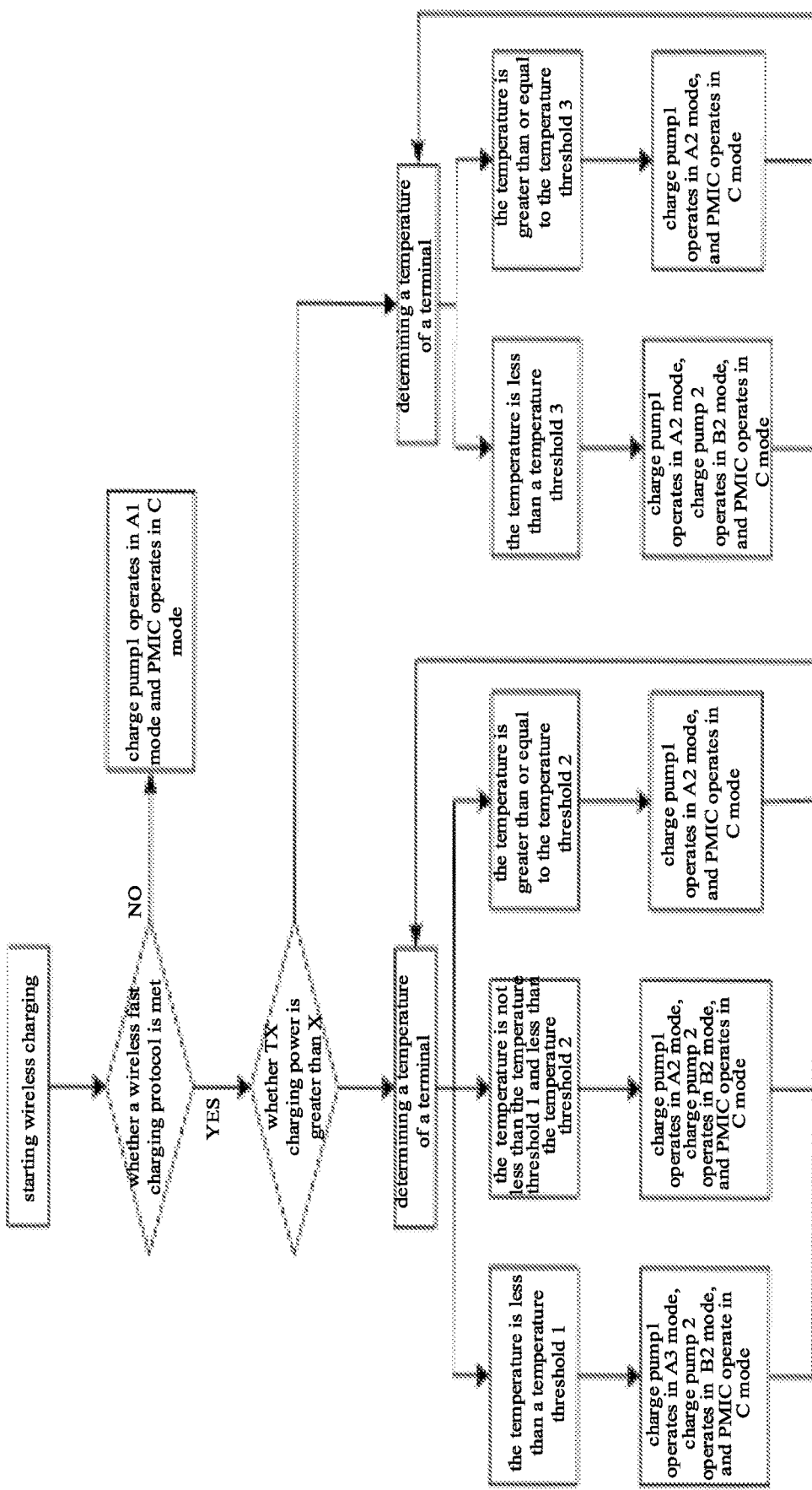
FIG. 4 is a flowchart of a method for controlling wireless charging according to an embodiment of the disclosure.

In detail, as illustrated in FIG. 4, when the terminal device starts wireless charging, it may be determined whether the terminal device complies with the wireless fast charging protocol. When the terminal device complies with the wireless fast charging protocol, the charging power may be obtained first, that is, TX charging power is obtained, and it is determined whether the charging power is greater than a preset power threshold X. The preset power threshold X may be customized according to actual parameters of the terminal device. The power of the wireless charging base supported by the terminal device may be various values, such as 10 w, 20 w, 30 w and 50 w. However, not all wireless charging bases can operate under high voltage when in use. Only when the charging power is greater than the preset power threshold, the highest voltage output by the terminal device may be greater than 20V.

When it is determined that the charging power is greater than the preset power threshold X, the operating mode of the wireless charging system may be determined according to the temperature and the first control rule. When it is determined that the temperature is less than the first temperature threshold, the operating mode of the first charge pump is determined as the first mode, the operating mode of the second charge pump is determined as the second mode, and the operating mode of the PMIC is determined as the charging mode, that is, the first charge pump operates in the mode A3, the second charge pump operates in mode B2, and PMIC operates in mode C. The mode A3 indicates that the ratio of input voltage to output voltage is 3:1, and the mode B2 indicates that the ratio of input voltage to output voltage is 2:1.

When the temperature is greater than or equal to the first temperature threshold, it is determined whether the temperature is less than the second temperature threshold. When the temperature is less than the second temperature threshold, it is determined that the operating mode of the first charge pump is the second mode, the operating mode of the second charge pump is the second mode, and the operating mode of the PMIC is the charging mode, that is, the first charge pump operates in the mode A2, the second charge pump operates in the mode B2, and PMIC operates in mode C. The mode A2 indicates that the ratio of input voltage to output voltage is 2:1, and the mode B2 indicates that the ratio of input voltage to output voltage is 2:1.

When the temperature is not less than the second temperature threshold, it is determined that the operating mode of the first charge pump is the second mode, and the operating mode of the PMIC is the charging mode, that is, the first charge pump operates in the mode A2, and the PMIC operates in the mode C. The mode A2 means that the ratio of input voltage to output voltage is 2:1. The first temperature threshold is less than the second temperature threshold.

Further, when it is determined that the charging power is less than or equal to the preset power threshold X, the operating mode of the wireless charging system may be determined according to the temperature and the second control rule. When it is determined that the temperature is less than a third temperature threshold, it is determined that the operating mode of first charge pump is the second mode, the operating mode of the second charge pump is the second mode, and the operating mode of the PMIC is the charging mode, that is, the first charge pump operates in mode A2, the second charge pump operates in mode B2, and the PMIC operates in mode C. The mode A2 indicates that the ratio of input voltage to output voltage is 2:1, and the mode B2 indicates that the ratio of input voltage to output voltage is 2:1.

When it is determined that the temperature is greater than or equal to the third temperature threshold, it is determined that the operating mode of the first charge pump is the second mode and the operating mode of the PMIC is the charging mode, that is, the first charge pump operates in the mode A2, and the PMIC operates in the mode C.

At step S103, the wireless charging system is controlled to enter the operating mode corresponding to one of the at least two control rules.

After the operating mode of the wireless charging system is determined, a configuration file corresponding to the operating mode is obtained. The configuration file is configured with parameters corresponding to the wireless charging system that meets the control rule. The configuration file is parsed, so that the wireless charging system is controlled to enter the operating mode corresponding to the control rule by controlling parameters of the first charge pump, the second charge pump and the PMIC in the wireless charging system.

For example, when the terminal device needs to be wirelessly charged, the user may place the terminal device on the wireless charging base. At this time, the connection between the terminal device and the wireless charging base is established. Then it is determined whether the wireless charging protocol is met. When it is determined that the wireless charging protocol is met, the charging power and the temperature of the terminal device may be obtained, and the operating mode of each device in the wireless charging system is determined according to the preset rule. When it is determined that the wireless charging protocol is not met, the operating mode of the first charge pump may be determined to be the third mode, that is, the ratio of the input voltage to the output voltage is 1:1, and the operating mode of the PMIC may be determined to be the charging mode. The PMIC controls the normal charging of the lithium battery.

When the terminal device complies with the wireless charging protocol, it means that the terminal device supports the wireless fast charging function, and the charging power may be obtained, and it may be determined whether the charging power is greater than the preset power threshold. If the charging power is greater than the preset power threshold, it means that the terminal device may be in a high-voltage state, and then it is determined whether the temperature is less than the first temperature threshold. When the temperature is less than the first temperature threshold, it is determined that first charge pump operates in mode A3, the second charge pump operates in mode B2, and the PMIC operates in mode C. The mode A3 indicates that the ratio of input voltage to output voltage is 3:1, and the mode B2 is that the ratio of input voltage to output voltage is 2:1. That is, for example, when the charging power is 30 W, and the corresponding output voltage is 30V and the output current is 1 A, first step-down may be performed by the first charge pump to reduce the voltage and current to 10V/3 A through 3:1 step-down, and then second step-down may be performed by the second charge pump to reduce the voltage and current to 5V/6 A through 2:1 step-down, so that the battery voltage of 5V is reached, and the power is charged into the battery through the PMIC.

When the temperature is greater than or equal to the first temperature threshold, it is determined whether the temperature is less than the second temperature threshold. When the temperature is less than the second temperature threshold, it is determined that the first charge pump operates in mode A2, the second charge pump operates in mode B2, and the PMIC operates in mode C. The mode A2 indicates that the ratio of input voltage to output voltage is 2:1, and the mode B2 indicates that the ratio of input voltage to output voltage is 2:1. That is, at this time, when the temperature is high and the maximum output voltage is 20V and the maximum output current is 1 A, first step-down may be performed by the first charge pump to reduce the voltage and current to 10V/2 A by 2:1, and then second step-down may be performed by the second charge pump to reduce the voltage and current to 5V/6 A by 2:1, so that the battery voltage of 5V is reached, and the power is charged into the battery through the PMIC.

When the temperature is greater than or equal to the second temperature threshold, it is determined that the first charge pump operates in the mode A2 and the PMIC operates in the mode C. The mode A2 indicates that the ratio of the input voltage to the output voltage is 2:1. That is, at this time, the temperature of the terminal device is relatively high, because the terminal itself generates heat during the charging process. Thus, the operating voltage is below 20V, for example, the charging power is 10V/1 A. Since no particularly large charging power is required, the second charge pump does not need to operate, and only the first charge pump operates in mode A2, to reduce the power to 5V/6 A by 2:1 step-down, so that the battery voltage of 5V is reached, and power is charged into the battery through the PMIC.

Further, when the charging power is less than or equal to the preset power threshold, the operating mode of the wireless charging system may be determined according to the temperature and the second control rule. When it is determined that the temperature of the terminal device is less than the third temperature threshold, it is determined that the first charge pump operates in mode A2, the second charge pump operates in mode B2, and the PMIC operates in mode C. The mode A2 indicates that the ratio of input voltage to output voltage is 2:1, and the mode B2 indicates that the ratio of input voltage to output voltage is 2:1. That is, relatively larger power is not supported, and the maximum output voltage does not exceed 20V. If the temperature is relatively low, it is desired to charge the battery with high power. For example, when the maximum output voltage is 20V and the maximum output current is 1 A, first step-down may be performed by the first charge pump to reduce the voltage and current to 10V/2 A by 2:1, and then second step-down may be performed by the second charge pump to reduce the voltage and current to 5V/6 A by 2:1, so that the battery voltage of 5V is reached, and the power is charged into the battery through the PMIC.

When the charging power is greater than or equal to the third temperature threshold, it is determined that the first charge pump operates in mode A2 and the PMIC operates in mode C. That is, the temperature of the terminal device is relatively high at this time, because the terminal generates heat itself in the charging process. Thus, the operating voltage must be below 20V, for example, the charging power is 10V/1 A. Since no particularly large charging power is required, the second charge pump does not need to operate, and only the first charge pump is required to operate in A2 mode, to reduce the voltage to 5V/6 A by 2:1 step-down, so that the battery voltage is reached, and the power is charged into the battery through the PMIC.

With the method for controlling wireless charging provided by embodiments of the present disclosure, the charging power and the temperature of the terminal device are obtained, the operating mode of the wireless charging system is determined based on the charging power and the temperature according to the preset rule, in which the preset rule includes at least two control rules and operating modes corresponding to the at least two control rules respectively, and then the wireless charging system is controlled to enter the operating mode corresponding to one of the at least two control rules. With this technical solution, since at least two control rules are provided, only the charging power and the temperature of the terminal need to be obtained, which can fully consider the influencing factors in the wireless charging process, and can automatically control each device in the wireless charging system to enter the operating mode corresponding to each control rule, not only realizing fast and efficient wireless charging, but also ensuring safety of wireless charging, avoiding loss of charging coils, switches and other devices, reducing heating generated in the charging process, and further improving the user experience.

Figure 5:
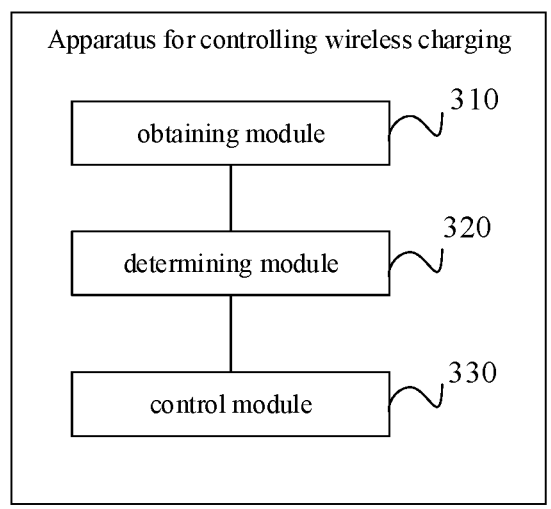
FIG. 5 is a block diagram of an apparatus for controlling wireless charging according to an embodiment of the disclosure.

FIG. 5 is a block diagram of an apparatus for controlling wireless charging according to an embodiment of the disclosure. The apparatus may be a device in the terminal device. As illustrated in FIG. 5, the apparatus 300 includes an obtaining module 310, a determining module 320 and a control module 330.

The obtaining module 310 is configured to obtain a charging power and a temperature of the terminal device.

The determining module 320 is configured to determine an operating mode of the wireless charging system based on the charging power and the temperature according to a preset rule, in which the preset rule includes at least two control rules and operating modes corresponding to the at least two control rules respectively.

The control module 330 is configured to control the wireless charging system to enter the operating mode corresponding to one of the at least two control rules.

Optionally, the determining module 320 is configured to:
determine whether the charging power is greater than a preset power threshold;
determine the operating mode of the wireless charging system according to the temperature and the first control rule in response to the charging power being greater than the preset power threshold; and
determine the operating mode of the wireless charging system according to the temperature and the second control rule in response to the charging power being equal to or less than the preset power threshold.

Optionally, the determining module 320 is further configured to:
determine whether the temperature is less than a first temperature threshold;
in response to the temperature being less than the first temperature threshold, determine that an operating mode of the first charge pump is a first mode, an operating mode of the second charge pump is a second mode, and an operating mode of the PMIC is a charging mode;
in response to the temperature being equal to or greater than the first temperature threshold, determine whether the temperature is less than a second temperature threshold, in which the first temperature threshold is less than the second temperature threshold; and
in response to the temperature being less than the second temperature threshold, determine that the operating mode of the first charge pump is the second mode, the operating mode of the second charge pump is the second mode, and the operating mode of the PMIC is the charging mode.

Optionally, the determining module 320 is further configured to:
in response to the temperature being equal to or greater than the second temperature threshold, determine that the operating mode of the first charge pump is the second mode and the operating mode of the PMIC is the charging mode.

Optionally, the determining module 320 is further configured to:
determine whether the temperature is less than a third temperature threshold;
in response to the temperature being less than the third temperature threshold, determine that the operating mode of the first charge pump is the second mode, the operating mode of the second charge pump is the second mode, and the operating mode of the PMIC is the charging mode; and
in response to the temperature being equal to or greater than the third temperature threshold, determine that the operating mode of the first charge pump is the second mode and the operating mode of the PMIC is the charging mode.

Optionally, the control module 330 is further configured to:
obtain a configuration file corresponding to the operating mode, in which the configuration file is configured with parameters corresponding to the wireless charging system that comply with the control rule; and
control the wireless charging system to enter the operating mode corresponding to the control rule by analyzing the configuration file.

Optionally, the apparatus is further configured to:
determine whether the terminal device complies with a wireless charging protocol;
determine that the operating mode of the first charge pump is the third mode and the operating mode of the PMIC is the charging mode, in response to the terminal device not complying with the wireless charging protocol; and
obtain the charging power and the temperature, in response to the terminal device complying with the wireless charging protocol.

It could be understood that the functions of respective functional modules of the wireless charging control device of this embodiment may be implemented according to the method in the above embodiments, and with respect to the specific implementation process, reference may be made to relevant description of the above method embodiments, which will not be repeated here.

In summary, with the apparatus for controlling wireless charging provided by embodiments of the disclosure, the charging power and the temperature of the terminal device are obtained by the obtaining module, the operating mode of the wireless charging system is determined by the determining module based on the charging power and the temperature according to the preset rule, in which the preset rule includes at least two control rules and operating modes corresponding to the at least two control rules respectively, and then the wireless charging system is controlled by the control module to enter the operating mode corresponding to one of the at least two control rules. With this technical solution, since at least two control rules are provided, only the charging power and the temperature of the terminal need to be obtained, which can fully consider the influencing factors in the wireless charging process, and can automatically control each device in the wireless charging system to enter the operating mode corresponding to each control rule, not only realizing fast and efficient wireless charging, but also ensuring safety of wireless charging, avoiding loss of charging coils, switches and other devices, reducing heating generated in the charging process, and further improving the user experience.

Figure 6:
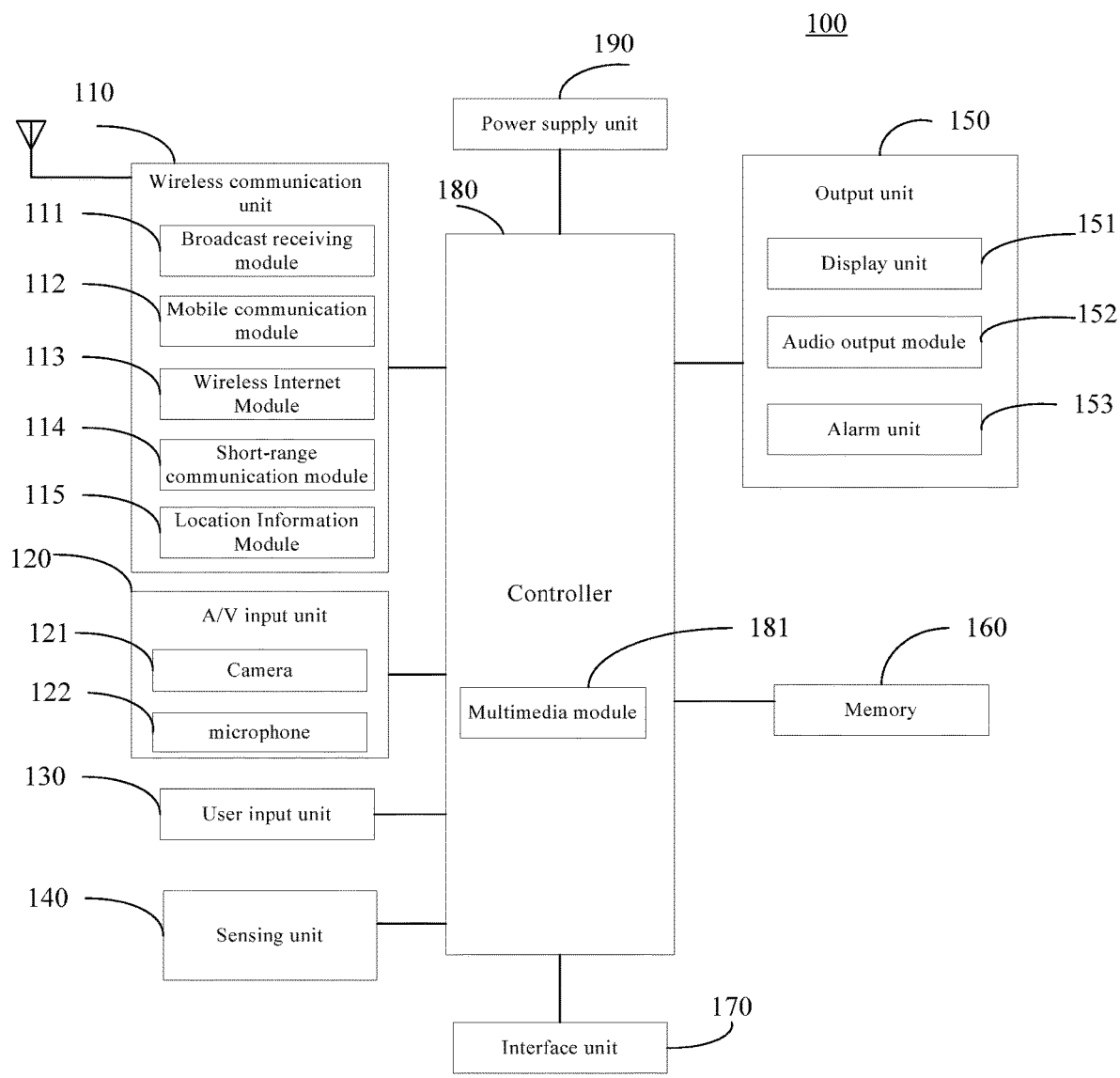
FIG. 6 is a block diagram of a terminal device according to an embodiment of the disclosure.

FIG. 6 is a block diagram of a terminal device according to an embodiment of the disclosure. The terminal 100 may include a wireless communication unit 110, an A/V (audio/video) input unit 120, a user input unit 130, a sensing unit 140, an output unit 150, a memory 160, an interface unit 170, a controller 180, a power supply unit 190. FIG. 6 shows a terminal with various components, but it should be understood that implementation of all the shown components is not required. Alternatively, more or fewer components may be implemented. The elements of the terminal are described in detail below.

The wireless communication unit 110 generally includes one or more components that allow radio communication between the terminal 100 and a wireless communication system or network. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast related information from an external broadcast management server via broadcast channels. Broadcast channels may include satellite channels and/or terrestrial channels. The broadcast management server may be a server that generates and transmits the broadcast signals and/or broadcast related information or a server that receives previously generated broadcast signals and/or broadcast related information and sends the previously generated broadcast signals and/or broadcast related information to the terminal. The broadcast signals may include TV broadcast signals, radio broadcast signals and data broadcast signals. The broadcast signals may further include broadcast signals combined with TV or radio broadcast signals. The broadcast-related information may also be provided via a mobile communication network. In this case, the broadcast-related information may be received by the mobile communication module 112. The broadcast signals may exist in various forms, for example, in the forms of an electronic program guide (EPG) of digital multimedia broadcasting (DMB), and an electronic service guide (ESG) of digital video broadcasting handheld (DVB-H). The broadcast receiving module 111 may receive digital broadcasts by using various digital broadcasting systems, such as multimedia broadcasting-terrestrial (DMB-T), digital multimedia broadcasting-satellite (DMB-S), digital video broadcasting-handheld (DVB-H), digital broadcasting systems with forward link media (MediaFLO®), and integrated terrestrial digital broadcasting services (ISDB-T). The broadcast receiving module 111 may be configured to be suitable for various broadcast systems that provide broadcast signals as well as the above-mentioned digital broadcast systems. The broadcast signal and/or broadcast-related information received via the broadcast receiving module 111 may be stored in the memory 160 (or other types of storage media).

The mobile communication module 112 transmits radio signals to and/or receives radio signals from at least one of a base station (for example, an access point or a Node B), an external terminal, and a server. Such radio signals may include voice call signals, video call signals, or various types of data transmitted and/or received according to text and/or multimedia messages.

The wireless Internet module 113 supports wireless Internet access of the terminal. The module may be internally or externally coupled to the terminal. The wireless Internet access technologies related to this module include WLAN (Wireless LAN) (Wi-Fi), Wibro (Wireless Broadband), Wimax (Worldwide Interoperability for Microwave Access), and HSDPA (High Speed Downlink Packet Access).

The short-range communication module 114 is a module supporting short-range communication. Short-range communication technologies include Bluetooth™, Radio Frequency Identification (RFID), Infrared Data Association (IrDA), Ultra Wideband (UWB), Zigbee, and so on.

The location information module 115 is a module for checking or acquiring location information of the terminal. A typical example of the location information module is GPS (Global Positioning System). Through current technologies, the GPS module 115 calculates distance information and accurate time information from three or more satellites and applies triangulation to the calculated information, thereby accurately calculating three-dimensional current location information based on longitude, latitude and altitude. Currently, a method for calculating location and time information uses three satellites and corrects errors in the calculated position and time information by using another satellite. In addition, the GPS module 115 also calculates speed information by continuously calculating current location information in real time.

The A/V input unit 120 is configured to receive audio or video signals. The A/V input unit 120 may include a camera 121 and a microphone 1220, and the camera 121 processes image data of still pictures or videos obtained by an image capture device in a video capture mode or an image capture mode. The processed image frames may be displayed on the display unit 151. The image frames processed by the camera 121 may be stored in the memory 160 (or other storage medium) or transmitted via the wireless communication unit 110, and two or more cameras 1210 may be provided according to the configuration of the terminal. The microphone 122 may receive sound (audio data) via the microphone in operation modes such as telephone call mode, recording mode, voice recognition mode and the like, and processes such sound into audio data. The processed audio (voice) data may be converted in a telephone call mode into a format that may be sent to a mobile communication base station via the mobile communication module 112 for output. The microphone 122 may implement various types of noise cancellation (or suppression) algorithms to eliminate (or suppress) noise or interference generated in the process of receiving and transmitting audio signals.

The user input unit 130 may generate key input data according to commands input by the user to control various operations of the terminal. The user input unit 130 allows the user to input various types of information, and may include a keyboard, a pot slice, a touchpad (for example, a touch-sensitive component that detects changes in resistance, pressure and capacitance due to being contacted), a scroll wheel and a rocker. In particular, when a touch pad is superimposed on the display unit 151 in the form of a layer, a touch screen may be formed.

The sensing unit 140 detects the current state of the terminal 100 (for example, open or closed state of the terminal 100), the location of the terminal 100, the presence or absence of the user's contact (i.e., touch input) with the terminal 100, the orientation of the terminal 100, and the acceleration or deceleration movement and direction of the terminal 100, and generates a command or signal for controlling the operation of the terminal 100. For example, when the terminal 100 is implemented as a sliding type mobile phone, the sensing unit 140 may sense whether the sliding type phone is opened or closed. In addition, the sensing unit 140 detects whether the power supply unit 190 provides power or whether the interface unit 170 is coupled with an external device.

The interface unit 170 serves as an interface through which at least one external device may be connected to the terminal 100. For example, the external device may include a wired or wireless headset interface, an external power source (or battery charger) interface, a wired or wireless data interface, a memory card interface, an interface for connecting a device with an identification module, audio input/output (I/O) interface, video I/O interface, headphone interface. The identification module may store various information for verifying that the user uses the terminal 100 and may include a user identity module (UIM), a subscriber identity module (SIM), a universal subscriber identity module (USIM), and so on. In addition, a device with an identity module (hereinafter referred to as an "identification device") may take the form of a smart card. Therefore, the identification device may be connected to the terminal 100 via an interface or other connection device. The interface unit 170 may be used to receive input (for example, data information and power) from an external device and transmit the received input to one or more elements in the terminal 100 or may be used to transfer data between the terminal and the external device.

In addition, when the terminal 100 is connected to an external base, the interface unit 170 may be used as a path through which power is provided from the base to the terminal 100 or may be used as a path through which various command signals input from the base are transmitted to the terminal. Various command signals or power input from the base may be used as signals for determining whether the terminal is accurately installed on the base. The output unit 150 is configured to provide output signals (for example, audio signals, video signals, alarm signals, and vibration signals) in a visual, audio, and/or tactile manner. The output unit 150 may include a display unit 151, an audio output module 152, and an alarm unit 153.

The display unit 151 may display information processed in the terminal 100. For example, when the terminal 100 is in a telephone call mode, the display unit 151 may display a user interface (UI) or a graphical user interface (GUI) related to a call or other communications (e.g., text message sending and receiving, multimedia file download, etc.). When the terminal 100 is in a video call mode or an image capturing mode, the display unit 151 may display a captured image and/or a received image, or a UI or GUI showing a video or image and related functions.

Meanwhile, when the display unit 151 and the touch pad are superimposed on each other in the form of a layer to form a touch screen, the display unit 151 may be used as an input device and an output device. The display unit 151 may include at least one of a liquid crystal display (LCD), a thin film transistor LCD (TFT-LCD), an organic light emitting diode (OLED) display, a flexible display, and a three-dimensional (3D) display. Some of these displays may be configured to be transparent to allow users to view from the outside, which may be referred to as a transparent display, and a typical transparent display may be, for example, a TOLED (transparent organic light emitting diode) display or the like. According to a specific desired implementation, the terminal 100 may include two or more display units (or other display devices), for example, the terminal may include an external display unit (not shown) and an internal display unit (not shown). The touch screen may be used to detect touch input pressure as well as touch input position and touch input area.

The audio output module 152 converts audio data received by the wireless communication unit 110 or stored in the memory 160 into audio signals and output as sound when the terminal is in a call signal receiving mode, a call mode, a recording mode, a voice recognition mode, and a broadcast receiving mode. Moreover, the audio output module 152 may provide audio output related to a specific function performed by the terminal 100 (for example, call signal reception sound, and message reception sound). The audio output module 152 may include a speaker or a buzzer.

The alarm unit 153 may provide an output to notify the terminal 100 of the occurrence of an event. Typical events may include call reception, message reception, key signal input and touch input. In addition to audio or video output, the alarm unit 153 may provide output in different ways to notify the occurrence of the event. For example, the alarm unit 153 may provide an output in the form of vibration, and when a call, a message or other in coming communication is received, the alarm unit 153 may provide a tactile output (i.e., vibration) to notify the user. By providing such tactile output, the user recognizes the occurrence of various events even when the user's mobile phone is in the user's pocket. The alarm unit 153 may also provide an output notifying the occurrence of an event via the display unit 151 or the audio output module 152.

The memory 160 may store software programs for processing and control operations performed by the controller 180, or may temporarily store data that has been output or will be output (for example, phonebook, messages, still images and videos). The memory 160 may store data about vibrations and audio signals in various ways that are output when a touch is applied to the touch screen.

The memory 160 may include at least one type of storage medium including flash memory, hard disk, multimedia card, card-type memory (for example, SD or DX memory), random access memory (RAM), static random-access memory (SRAM), read-only memory (ROM), electrically erasable programmable read-only memory (EEPROM), programmable read-only memory (PROM), magnetic memory, magnetic disk and optical disk. The terminal 100 may cooperate with a network storage device that performs the storage function of the memory 160 through a network connection.

The controller 180 generally controls overall operation of the terminal. For example, the controller 180 performs control and processing related to voice calls, data communications, video calls, and so on. In addition, the controller 180 may include a multimedia module 1810 for reproducing (or playing back) multimedia data, and the multimedia module 1810 may be constructed within the controller 180 or may be constructed to be separated from the controller 180. The controller 180 may perform pattern recognition processing to recognize handwriting input or picture drawing input performed on the touch screen as characters or images.

The power supply unit 190 receives external power or internal power under the control of the controller 180 and provides appropriate power required to operate various elements and components.

Various embodiments described herein may be implemented in a computer-readable medium using, for example, computer software, hardware, or any combination thereof. For hardware implementation, the implementation described here may be implemented by using application specific integrated circuits (ASIC), digital signal processors (DSP), digital signal processing devices (DSPD), programmable logic devices (PLD), field programmable gate arrays (FPGA), a processor, a controller, a microcontroller, a microprocessor, and an electronic unit designed to perform the functions described herein. In some cases, such an implementation may be implemented in the controller 180. For software implementation, implementations such as procedures or functions may be implemented with a separate software module that allows execution of at least one function or operation. The software codes may be implemented by software applications (or programs) written in any suitable programming language, and the software codes may be stored in the memory 160 and executed by the controller 180.

The flowcharts and block diagrams in the accompanying drawings illustrate possible implementations of the system architecture, functions, and operations of the system, method, and computer program product according to various embodiments of the disclosure. In this regard, each block in the flowchart or block diagram may represent a module, a program segment, or part of the code, and the above module, program segment, or part of the code contains one or more executable commands for realizing the specified logical function. It should also be noted that, in some alternative implementations, the functions labeled in the block may also occur in a different order from the order marked in the drawings. For example, two blocks shown in succession can actually be executed substantially in parallel, or sometimes be executed in the reverse order, depending on the functions involved. It should also be noted that each block in the block diagram and/or flowchart, and the combination of the blocks in the block diagram and/or flowchart, are implemented by a dedicated hardware-based system that performs the specified functions or operations or realized by a combination of dedicated hardware and computer commands.

The units or modules involved in the embodiments of the disclosure are implemented in software or hardware. The described unit or module may also be provided in the processor, for example, may be described as: a processor including an obtaining module, a determining module, and a control module. The names of these units or modules do not constitute a limitation on the units or modules themselves under certain circumstances. For example, the obtaining module may be described as a module "configured to obtain a charging power and a temperature of a terminal when it is determined that the terminal device complies with a wireless charging protocol".

The disclosure also provides a computer-readable storage medium. The computer-readable storage medium may be included in the electronic device described in the above embodiments; or may exist alone without being assembled into the electronic device. The above computer-readable storage medium stores one or more programs. When the above programs are used by one or more processors to execute the above method described in the disclosure, the method includes: obtaining a charging power and a temperature of the terminal; determining an operating mode of the wireless charging system based on the charging power and the temperature according to a preset rule, wherein the preset rule comprises at least two control rules and operating modes corresponding to the at least two control rules respectively; and controlling the wireless charging system to enter the operating mode corresponding to one of the at least two control rules.

In conclusion, with the method for controlling wireless charging, the apparatus for controlling wireless charging, the device and the storage medium provided by embodiments of the present disclosure, the charging power and the temperature of the terminal device are obtained, the operating mode of the wireless charging system is determined based on the charging power and the temperature according to the preset rule, in which the preset rule includes at least two control rules and operating modes corresponding to the two control rules respectively, and then the wireless charging system is controlled to enter the operating mode corresponding to one of the at least two control rules. With this technical solution, since at least two control rules are provided, only the charging output power and the temperature of the terminal need to be obtained, which can fully consider the influencing factors in the wireless charging process, and can automatically control each device in the wireless charging system to enter the operating mode corresponding to each control rule, not only realizing fast and efficient wireless charging, but also ensuring safety of wireless charging, avoiding loss of charging coils, switches and other devices, reducing heating generated in the charging process, and further improving the user experience.

The above description is only preferred embodiments of the disclosure and an explanation of the applied technical principles. Those skilled in the art should understand that the scope of the invention involved in the disclosure is not limited to the technical solution formed by the specific combination of the above technical features, but should also cover any combination of the above technical features or their equivalents without departing from the inventive concept. For example, the above features and the technical features disclosed in the disclosure (but not limited to) with similar functions are mutually replaced to form a technical solution.

What is claimed is:

1. A method for controlling wireless charging, comprising:
    obtaining by a terminal device, a charging power and a temperature of the terminal device, wherein the terminal device comprises a wireless charging system;
    determining by the terminal device, an operating mode of the wireless charging system based on the charging power and the temperature according to a preset rule, wherein the preset rule comprises at least two control rules and operating modes corresponding to the at least two control rules respectively, wherein the preset rule comprises a first control rule and a second control rule, and determining the operating mode of the wireless charging system based on the charging power and the temperature according to the preset rule, comprises: determining whether the charging power is greater than a preset power threshold; determining the operating mode of the wireless charging system according to the temperature and the first control rule in response to the charging power being greater than the preset power threshold; and determining the operating mode of the wireless charging system according to the temperature and the second control rule in response to the charging power being equal to or less than the preset power threshold; and
    controlling by the terminal device, the wireless charging system to enter the operating mode corresponding to one of the at least two control rules;
    wherein the wireless charging system comprises a first charge pump, a second charge pump and a PMIC (power management IC), and determining the operating mode of the wireless charging system according to the temperature and the first control rule comprises:
    determining one of following modes as the operating mode of the wireless charging system:
    an operating mode of the first charge pump being a first mode, an operating mode of the second charge pump being a second mode, and an operating mode of the PMIC being a charging mode;
    the operating mode of the first charge pump being the second mode, the operating mode of the second charge pump being the second mode, and the operating mode of the PMIC being the charging mode; or the operating mode of the first charge pump being the second mode and the operating mode of the PMIC being the charging mode.

2. The method of claim 1, determining the operating mode of the wireless charging system according to the temperature and the first control rule, comprises:
   determining whether the temperature is less than a first temperature threshold;
   in response to the temperature being less than the first temperature threshold, determining that the operating mode of the first charge pump is the first mode, the operating mode of the second charge pump is the second mode, and the operating mode of the PMIC is the charging mode;
   in response to the temperature being equal to or greater than the first temperature threshold, determining whether the temperature is less than a second temperature threshold, wherein the first temperature threshold is less than the second temperature threshold; and
   in response to the temperature being less than the second temperature threshold, determining that the operating mode of the first charge pump is the second mode, the operating mode of the second charge pump is the second mode, and the operating mode of the PMIC is the charging mode.

3. The method of claim 2, further comprising:
   in response to the temperature being equal to or greater than the second temperature threshold, determining that the operating mode of the first charge pump is the second mode and the operating mode of the PMIC is the charging mode.

4. The method of claim 1, wherein determining the operating mode of the wireless charging system according to the temperature and the second control rule comprises:
   determining whether the temperature is less than a third temperature threshold;
   in response to the temperature being less than the third temperature threshold, determining that the operating mode of the first charge pump is the second mode, the operating mode of the second charge pump is the second mode, and the operating mode of the PMIC is the charging mode; and
   in response to the temperature being equal to or greater than the third temperature threshold, determining that the operating mode of the first charge pump is the second mode and the operating mode of the PMIC is the charging mode.

5. The method of claim 1, wherein controlling the wireless charging system to enter the operating mode corresponding to the control rule comprises:
   obtaining a configuration file corresponding to the operating mode, wherein the configuration file is configured with parameters corresponding to the wireless charging system that comply with the control rule; and
   controlling the wireless charging system to enter the operating mode corresponding to the control rule by analyzing the configuration file.

6. The method of claim 1, further comprising:
   determining whether the terminal device complies with a wireless charging protocol;
   determining that the operating mode of the first charge pump is the third mode and the operating mode of the PMIC is the charging mode, in response to the terminal device not complying with the wireless charging protocol; and
   obtaining the charging power and the temperature, in response to the terminal device complying with the wireless charging protocol.

7. An apparatus for controlling wireless charging, comprising:
   a processor; and
   a memory, configured to store instructions executable by the processor, wherein the processor is configured to read and execute the instructions stored in the memory, so as to:
   obtain a charging power and a temperature of a terminal device;
   determine an operating mode of a wireless charging system of the terminal device based on the charging power and the temperature according to a preset rule, wherein the preset rule comprises at least two control rules and operating modes corresponding to the at least two control rules respectively; and
   control the wireless charging system to enter the operating mode corresponding to one of the at least two control rules;
   wherein the preset rule comprises a first control rule and a second control rule, and the processor is configured to:
   determine whether the charging power is greater than a preset power threshold;
   determine the operating mode of the wireless charging system according to the temperature and the first control rule in response to the charging power being greater than the preset power threshold; and
   determine the operating mode of the wireless charging system according to the temperature and the second control rule in response to the charging power being equal to or less than the preset power threshold;
   wherein the wireless charging system comprises a first charge pump, a second charge pump and a PMIC (power management IC), and determining the operating mode of the wireless charging system according to the temperature and the first control rule comprises:
   determining one of following modes as the operating mode of the wireless charging system:
   an operating mode of the first charge pump being a first mode, an operating mode of the second charge pump being a second mode, and an operating mode of the PMIC being a charging mode;
   the operating mode of the first charge pump being the second mode, the operating mode of the second charge pump being the second mode, and the operating mode of the PMIC being the charging mode; or
   the operating mode of the first charge pump being the second mode and the operating mode of the PMIC being the charging mode.

8. The apparatus of claim 7, wherein the processor is configured to:
   determine whether the temperature is less than a first temperature threshold;
   in response to the temperature being less than the first temperature threshold, determine that the operating mode of the first charge pump is the first mode, the operating mode of the second charge pump is the second mode, and the operating mode of the PMIC is the charging mode;
   in response to the temperature being equal to or greater than the first temperature threshold, determine whether the temperature is less than a second temperature threshold, wherein the first temperature threshold is less than the second temperature threshold; and in response to the temperature being less than the second temperature threshold, determine that the operating mode of the first charge pump is the second mode, the operating mode of the second charge pump is the second mode, and the operating mode of the PMIC is the charging mode.

9. The apparatus of claim 8, wherein the processor is further configured to:
in response to the temperature being equal to or greater than the second temperature threshold, determine that the operating mode of the first charge pump is the second mode and the operating mode of the PMIC is the charging mode.

10. The apparatus of claim 7, wherein the processor is configured to:
determine whether the temperature is less than a third temperature threshold;
in response to the temperature being less than the third temperature threshold, determine that the operating mode of the first charge pump is the second mode, the operating mode of the second charge pump is the second mode, and the operating mode of the PMIC is the charging mode; and
in response to the temperature being equal to or greater than the third temperature threshold, determine that the operating mode of the first charge pump is the second mode and the operating mode of the PMIC is the charging mode.

11. The apparatus of claim 7, wherein the processor is configured to:
obtain a configuration file corresponding to the operating mode, wherein the configuration file is configured with parameters corresponding to the wireless charging system that comply with the control rule; and
control the wireless charging system to enter the operating mode corresponding to the control rule by analyzing the configuration file.

12. The apparatus of claim 7, wherein the processor is further configured to:
determine whether the terminal device complies with a wireless charging protocol;
determine that the operating mode of the first charge pump is the third mode and the operating mode of the PMIC is the charging mode, in response to the terminal device not complying with the wireless charging protocol; and
obtain the charging power and the temperature, in response to the terminal device complying with the wireless charging protocol.

13. A terminal device, comprising:
a receiving coil, configured to receive a current emitted by a wireless charging device;
a receiver, configured to convert the current coupled by the receiving coil to a direct current;
a first charge pump, wherein a first end of the first charge pump is coupled to the receiver;
a second charge pump, wherein a first end of the second charge pump is coupled to the first charge pump;
a power management IC (PMIC), wherein a first end of the PMIC is coupled to a second end of the first charge pump;
a battery, wherein a second end of the second charge pump and a second end of the PMIC are coupled to the battery;
a temperature sensor, configured to obtain a temperature of the terminal device; and a processor, coupled to the first charge pump, the second charge pump, the PMIC, the temperature sensor and the receiver respectively, and configured to obtain a charging power based on the direct current, to obtain the temperature, and to control the first charge pump, the second charge pump and the PMIC to enter respective operating modes based on the charging power and the temperature according to a preset rule, in which the preset rule comprises at least two control rules and operating modes corresponding to the at least two control rules respectively.

14. The terminal device of claim 13, wherein the preset rule comprises a first control rule and a second control rule, and the processor is configured to:
determine whether the charging power is greater than a preset power threshold;
determine the operating modes of the first charge pump, the second charge pump and the PMIC according to the temperature and the first control rule in response to the charging power being greater than the preset power threshold; and
determine the operating modes of the first charge pump, the second charge pump and the PMIC according to the temperature and the second control rule in response to the charging power being equal to or less than the preset power threshold.

15. The terminal device of claim 13, wherein the processor is further configured to:
determine whether the terminal device complies with a wireless charging protocol;
determine that the operating mode of the first charge pump is the third mode and the operating mode of the PMIC is the charging mode, in response to the terminal device not complying with the wireless charging protocol; and
obtain the charging power and the temperature, in response to the terminal device complying with the wireless charging protocol.

16. The terminal device of claim 14, wherein the processor is configured to:
determine whether the temperature is less than a first temperature threshold;
in response to the temperature being less than the first temperature threshold, determine that an operating mode of the first charge pump is a first mode, an operating mode of the second charge pump is a second mode, and an operating mode of the PMIC is a charging mode;
in response to the temperature being equal to or greater than the first temperature threshold, determine whether the temperature is less than a second temperature threshold, wherein the first temperature threshold is less than the second temperature threshold;
in response to the temperature being less than the second temperature threshold, determine that the operating mode of the first charge pump is the second mode, the operating mode of the second charge pump is the second mode, and the operating mode of the PMIC is the charging mode; and
in response to the temperature being equal to or greater than the second temperature threshold, determine that the operating mode of the first charge pump is the second mode and the operating mode of the PMIC is the charging mode.

17. The terminal device of claim 14, wherein the processor is configured to:

determine whether the temperature is less than a third temperature threshold;

in response to the temperature being less than the third temperature threshold, determine that the operating mode of the first charge pump is the second mode, the operating mode of the second charge pump is the second mode, and the operating mode of the PMIC is the charging mode; and in response to the temperature being equal to or greater than the third temperature threshold, determine that the operating mode of the first charge pump is the second mode and the operating mode of the PMIC is the charging mode.

18. The terminal device of claim 14, wherein the processor is configured to:

obtain a configuration file corresponding to the operating mode, wherein the configuration file is configured with parameters corresponding to the first charge pump, the second charge pump and the PMIC that comply with the control rule; and control the first charge pump, the second charge pump and the PMIC to enter the operating mode corresponding to the control rule by analyzing the configuration file.

* * * * *